J. ROBERTSON.
Assignor, by mesne assignments, to THE ASHMUN SCREEN PLATE Co.
Process for Renewing, and Apparatus for Repairing Knotter, Strainer, or Screen Plates of Paper-Machines.
No. 8,542. Reissued Jan. 14, 1879.
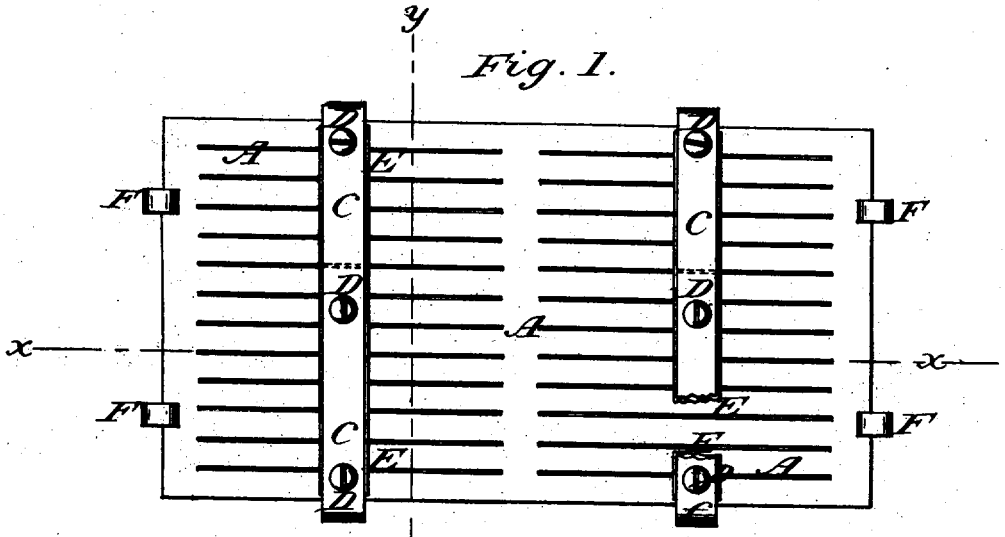
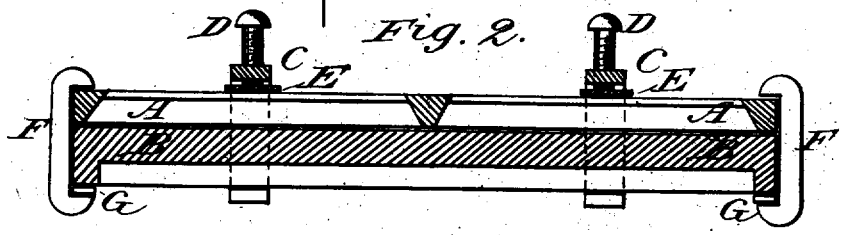
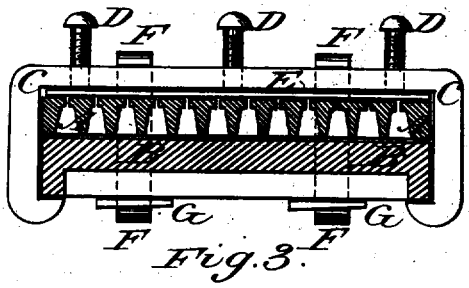
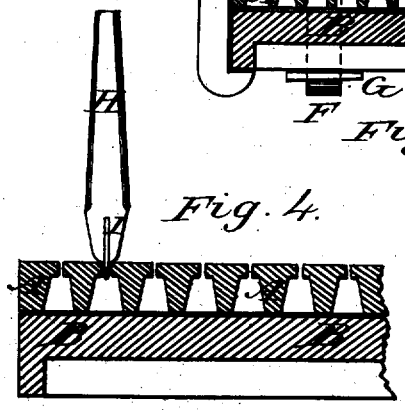
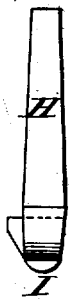
Attest:
A. W. Almqvist
C. Sedgwick
Inventor.
J. Robertson
N. PETERS, PHOTO-LITHOGRAPHER, WASHINGTON, D. C.

UNITED STATES PATENT OFFICE.

JAMES ROBERTSON, OF LASSWADE, SCOTLAND, ASSIGNOR, BY MESNE ASSIGNMENTS, TO THE ASHMUN SCREEN PLATE CO., OF PATERSON, N. J.

IMPROVEMENT IN PROCESSES FOR RENEWING, AND APPARATUS FOR REPAIRING, KNOTTER, STRAINER, OR SCREEN PLATES OF PAPER-MACHINES.

Specification forming part of Letters Patent No. 140,166, dated June 24, 1873; Reissue No. 8,542, dated January 14, 1879; application filed November 13, 1878.

*To all whom it may concern:*

Be it known that I, JAMES ROBERTSON, of Lasswade, in the county of Mid-Lothian, Scotland, have invented a Process for Repairing Knotter, Strainer, or Screen Plates for Paper-Machines, of which the following is a specification:

My invention has for its object the repairing and renewing strainer-plates the slots of which have been widened by the wear and corrosion due to the straining action and the acids in the pulp, so as to enable the said plates to be again used.

It consists in compressing the metal by hammering or otherwise, so as to expand it, and this may be done against a former or blade of a thickness corresponding to the required width of the slot.

The former or blade may be inserted in the set or drift, as shown in Figures 4 and 5, H.

One way of carrying my invention into effect will now be described, and is shown in the accompanying drawings, in which—

Fig. 1 represents a strainer-plate secured to the block or bed. Fig. 2 is a detail longitudinal section taken through the line *x x*, Fig. 1. Fig. 3 is a detail cross-section taken through the line *y y*, Fig. 1. Fig. 4 is a detail cross-section enlarged, and showing the tool in place. Fig. 5 is a side view of the tool.

Similar letters of reference indicate corresponding parts.

A represents the strainer-plate, about the construction of which there is nothing new. B is the table, block, or bed upon which the plate A is laid to be operated upon. The bed B is made of iron sufficiently heavy to support the plate A firmly, and which may be strengthened with ribs or flanges, either or both, upon its lower side; also to act as an anvil or block to allow the metal of the plate to be expanded or compressed by hammering or otherwise.

C are clamps, extending across the plate A, and the ends of which are bent downward and inward to overlap the lower side of the bed B, as shown in Fig. 3. In clamps C are formed screw-holes, in which are inserted the screws D, the forward ends of which rest against bars E, laid upon the plate A, beneath the clamps C, as shown in Figs. 2 and 3, so that by turning the screws D forward the plate A will be pressed down firmly upon the bed B. The plate A is further secured to bed B by the edge-clamp F, which crosses the edges of the plate A and bed B, and the ends of which overlap the upper side of the plate A and the lower side of the bed B, as shown in Figs. 1, 2, and 3, where they are secured in place by wedge-keys G, as shown in Fig. 2.

H is the body or shank of the tool, the lower end of which is slotted to receive the blade I, which is secured in place by screws, bolts, or other convenient means. The blade I must be of a thickness exactly equal to the required width of the slots in the plate A. The lower end of the shank or handle H is so formed as to press or draw the metal of the plate A, at the edges of the slots in said plate, inward against the sides of the blade I, thus reducing the side of said slots.

In using the apparatus, the plate A is secured to the bed or block B in the manner hereinbefore described. The block I is then inserted in the slots of the plate A, and by a few blows of a hammer upon the upper end of the handle H the metal of the plate A will be drawn or packed against the blade I, reducing the slot again to the required size, the blade I acting as a gage.

The plate A when repaired in this way is even better, and will last longer, than when new, as the metal is compressed among the slots, and is thus better adapted to resist the wear and the action of the acids.

One or both the side edges of the blade I may project in hook form, as shown in Fig. 5, so that it may be used for cleaning the slots before reducing the width.

I do not intend to confine myself to the above-described method, but under some circumstances prefer to expand the metal by hammering, or by using a calking-tool, punch, or set, and then to cut the slots out by a fine saw or cutter.

Having thus described my invention, I claim as new and desire to secure by Letters Patent—

1. The process of reducing the size of the slots in strainer or screen plates when they have become too large by wear, which consists in expanding the metal of such plates by compression, substantially as described.

2. The process of regulating the width of the slot by placing a blade in the slot and setting up the metal, or expanding on each side against it, to re-form the slot to a desired size.

3. The above-described tool, with handle H and blade I inserted in slot at lower end, the lower end of handle so formed as to press or draw the metal of the plate inward against the sides of said blade.

JAMES ROBERTSON.

Witnesses:

ALEXANDER TOD,
60 *North Castle Street, Edinburgh.*

DAVID BALFOUR,
8 *Moncrieff Terrace, Edinburgh.*